United States Patent
Torola et al.

(10) Patent No.: US 12,056,032 B2
(45) Date of Patent: Aug. 6, 2024

(54) MULTI-PATH APPLICATION OUTPUT

(71) Applicant: BMC Software, Inc., Houston, TX (US)

(72) Inventors: Jason Ronald Torola, Katy, TX (US); Anthony Louis Lubrano, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 260 days.

(21) Appl. No.: 17/657,617

(22) Filed: Mar. 31, 2022

(65) Prior Publication Data
US 2023/0315602 A1 Oct. 5, 2023

(51) Int. Cl.
*G06F 11/30* (2006.01)
*G06F 9/54* (2006.01)
*G06F 11/07* (2006.01)

(52) U.S. Cl.
CPC .......... *G06F 11/3075* (2013.01); *G06F 9/544* (2013.01); *G06F 11/0772* (2013.01); *G06F 11/3034* (2013.01); *G06F 2209/543* (2013.01)

(58) Field of Classification Search
None
See application file for complete search history.

(56) References Cited

U.S. PATENT DOCUMENTS

| | | | |
|---|---|---|---|
| 2012/0216031 A1* | 8/2012 | Baumgarth | G06F 11/0787 713/100 |
| 2017/0063966 A1* | 3/2017 | Kalish | G06F 9/45516 |
| 2018/0300186 A1* | 10/2018 | Grantham | G06F 16/258 |
| 2019/0213274 A1* | 7/2019 | Cadarette | G06F 16/27 |

OTHER PUBLICATIONS

IBM, "z/OS Basic Skills: Reusable JCL collection," available online at <https://www.ibm.com/docs/en/zos-basic-skills?topic=collection-basic-jcl-concepts>, 2010, 2 pages.
IBM, "z/OS concepts; What is JES?", available online at <https://www.ibm.com/docs/en/zos-basic-skills?topic=jobs-what-is-jes>, 2010, 5 pages.
IBM, "z/OS MVS, What is a subsystem?" available online at <https://www.ibm.com/docs/en/zos/2.3.0?topic=interface-what-is-subsystem>, Mar. 3, 2021, 2 pages.

* cited by examiner

*Primary Examiner* — Umut Onat
(74) *Attorney, Agent, or Firm* — Brake Hughes Bellermann LLP

(57) ABSTRACT

Described techniques provide convenient, reliable, straight-forward techniques for enabling multi-path application outputs. A single application may be configured to output two or more data sets to two or more output destinations within a mainframe environment, without requiring copying or forwarding by an intermediate application utility.

20 Claims, 8 Drawing Sheets

```
****************************** Top of Data ******************************
//CUSTJOB  JOB  XXXX,'JOB TITLE',MSGCLASS=X,
//              NOTIFY=&SYSUID,REGION=0M
//*
//STEP01   EXEC PGM=CUSTPGM                  ←802
//SYSUT1   DD   DISP=SHR,DSN=INPUT.DATA(FILE) ←804
//SYSUT2   DD   SUBSYS=(MPSS,'JOBLOG','ALT(OUTDDN)','ALT(IRE)',  ←806
//              'ALT(TNY)')
//OUTDDN   DD   SYSOUT=*                     ←808
//IRE      DD   DISP=SHR,DSN=OUTPUT.IRE.FILE ←810
//TNY      DD   DISP=SHR,DSN=OUTPUT.TNY.FILE ←812
**************************** Bottom of Data ****************************
```

FIG. 8

MULTI-PATH APPLICATION OUTPUT

TECHNICAL FIELD

This description relates to data outputs from applications.

BACKGROUND

Applications frequently output data of various sorts and for various reasons. For example, an application may output a file, a report, a log, or any other type of data. The various types of data may be provided to various users of the data, including, e.g., auditors, managers, programmers, or many other types of users.

In many scenarios, an application may be required or requested to provide a single data set to multiple output destinations. For example, a single report may be both stored in a file and sent to a printer for printing.

It is possible to provide a single data set to multiple output destinations by using an intermediate application or program to copy or forward the data set following its output from the originating application. In other words, for example, an application may output a file to a first destination, which may then copy or forward the file to one or more additional destinations.

Such approaches, however, may result in a loss of control of the content of the data set. For example, the intermediate application or program may be used to alter the data set content, prior to forwarding the data set content to a subsequent destination(s). Moreover, requiring use of the intermediate application or program may introduce additional cost, delay, and inconvenience for a user of the original application, while also introducing a potential source of error in output reporting.

SUMMARY

According some general aspects, a computer program product may be tangibly embodied on a non-transitory computer-readable storage medium and may include instructions. When executed by at least one computing device, the instructions may be configured to cause the at least one computing device to determine, at a job manager subsystem of an operating system, a multi-path subsystem designated to cause an application to output application data to a first output data set and a second output data set, and activate the multi-path subsystem in conjunction with a first application task configured to output the application data to the first output data set, using the job manager subsystem. When executed, the instructions may be further configured to cause the at least one computing device to instruct the application, using the multi-path subsystem, to execute the first application task to output the first output data set, using the operating system, and instruct the application, using the job manager subsystem and the multi-path subsystem, to execute a second application task to output the application data to the second output data set, using the operating system.

According to other general aspects, a computer-implemented method may perform the instructions of the computer program product. According to other general aspects, a system, such as a mainframe system or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 8 is an example screenshot of program code that may be used in the system of FIG. 3.

DETAILED DESCRIPTION

Figure 1:
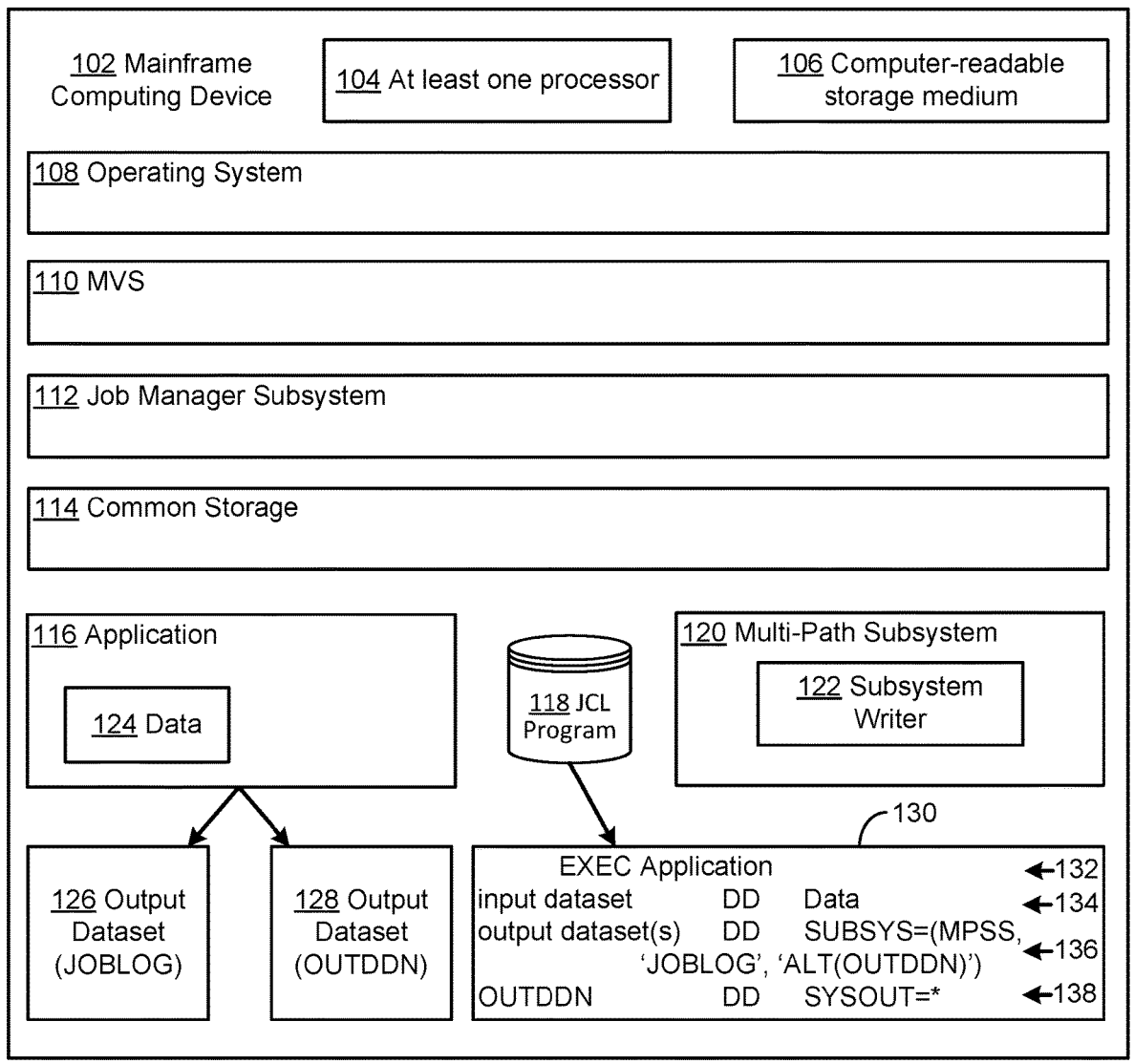
FIG. 1 is a block diagram of a system for multi-path application output.

Described systems and techniques enable, for example, multi-path application output of a single data set. By enabling an application to generate two or more outputs from the application directly to two or more output destinations, the described techniques guarantee data authenticity, while providing reliability and user convenience. Alternative solutions, in contrast, may require reprogramming the application and operational changes that may be costly or may not be possible due to the lack of source code for the application.

The following example descriptions are provided in the context of mainframe systems. In mainframe systems, centralized processing is provided for, and linked to, many different workstations or terminals, e.g., in a corporate environment. For example, such mainframe systems may provide core functionalities in healthcare, insurance, banking and finance, energy and oil and gas, manufacturing, or industrial settings, may store and process vast amounts of data for millions of customers, and may have been in use for multiple decades.

In a mainframe environment, many different applications may leverage a central mainframe operating system (OS) to perform various tasks, or jobs. For example, multiple applications may continuously require jobs to be performed by a mainframe OS, so that it becomes necessary to schedule a coordinated execution of the various jobs by the mainframe OS.

The mainframe OS may include, or be supplemented by, various types of system services or subsystem services (also referred to as subsystems). For example, various types of subsystem services may be used to provide core functionalities likely to be useful to many types of applications. Such core functionalities may include, for example, opening or closing files, providing various types of calculations, or storing/accessing/deleting data with respect to specific memory addresses.

Programming languages have been developed to enable applications to leverage such subsystems and other OS resources. For example, the Job Control Language (JCL) is an example language that may be used, e.g., to formulate, submit, and execute application jobs of a mainframe OS and associated subsystems.

As referenced above, many types of mainframe resources have been developed and used over the course of decades. Such mainframe resources may include, for example, the OS itself, OS subsystems, applications, hardware resources such as processors and memories, as well as job control programs used to enable desired interactions therebetween. Such mainframe resources may be extremely valuable to businesses or other entities using them.

Moreover, making changes to such mainframe resources may be undesirable or infeasible. For example, making changes to such mainframe resources may entail undesirable levels of risk, such as when many millions of customers or other users rely on the mainframe resources being modified. Moreover, even if a mainframe resource may be modified in a reliable manner, the corresponding modifications may require undesirable levels of cost, system downtime, and other inconveniences. It may be possible for an application programmer to change a program to rewrite a file to multiple outputs. However, such an approach would require access to the source code of the application, which may be difficult or impossible to access, particularly for legacy mainframe code. Reprogramming the application would require associated, ancillary changes to continue running in a mainframe environment. Each and all applications being reprogrammed would have the same or similar difficulties. Moreover, any modifications made would generally not be reusable, and each such application change may be costly in terms of development, testing, and implementation.

Described techniques nonetheless provide convenient, reliable, straightforward techniques for enabling multi-path application outputs. Consequently, as referenced above, a single application may be configured to output two or more data sets to two or more output destinations within a mainframe environment, without requiring copying or forwarding by an intermediate application, utility, or subsystem. Therefore, it is possible for the single application to provide the two or more output data sets in a reliable, efficient, convenient, and flexible manner.

Described techniques do not require modifications to an application code of an originating application, or to a mainframe OS, or to a mainframe subsystem. Described techniques may be implemented, for example, by modifying existing job control programs, such as JCL programs. Moreover, such JCL program changes may be made quickly and easily and may be used to enable outputs of a data set from a single application to two, three, or many different output destinations within a mainframe environment.

FIG. 1 is a block diagram of a system for multi-path application output. In FIG. 1, a mainframe computing device 102, which may be referred to herein as a mainframe computer or mainframe, refers to any computer, or combination of computers in communication with one another, that is used to implement the types of mainframe applications referenced above, including the more specific examples provided below.

As is known, the mainframe 102 may be deployed by a business owner or organization, e.g., to support business functions. The mainframe 102 may support many different workstations or peripheral devices, or otherwise provide access and business functions to employees, administrators, customers, or other users.

The mainframe 102 is illustrated as including at least one processor 104 and non-transitory computer-readable storage medium 106. As the mainframe 102 supports business-critical functions for many (e.g., millions) of users, the at least one processor 104 may be understood to represent many different processors (e.g., some of which may be included as part of the mainframe 102 and some of which may be included outside of the mainframe 102 but within a mainframe computing environment of the mainframe 102) providing significant quantities of processing power. Similarly, the non-transitory computer-readable storage medium 106 represents large quantities of various types of memory (e.g., registers, main memory, or bulk/secondary memory) that may be used to store instructions executable by the at least one processor 104, as well as to store data (e.g., business data, including customer data).

In addition to providing large quantities of processing and memory resources, the mainframe 102 should be understood to provide many other features and advantages, some of which are described herein by way of example. To assist in providing these features and advantages, an operating system (OS) 108 may be configured to, and optimized for, characteristics and functions of the mainframe 102. The OS 108 may, for example, provide task scheduling, application execution, and peripheral control. Put another way, the OS 108 enables use of the at least one processor 104 and the computer-readable storage medium 106 across many different use cases of the mainframe 102.

The OS 108 may represent or include a suite or collection of system tools and services designed to support operations of the mainframe computing device 102. In many cases, such tools and services may evolve over time, and new tools and services may be added as they are developed.

For example, the OS 108 may represent the z/OS® operating system, and may include, or utilize, a multiple virtual storage (MVS) system 110. In other examples, not specifically illustrated in FIG. 1, the OS 108 may use a z/OS Unix® system.

As referenced above, a job manager subsystem 112 represents a system, such as a subsystem, designed to facilitate and enable executions of jobs using the MVS 110, or, more generally, the OS 108. For example, the job manager subsystem 112 may be configured to identify and provide needed system resources to execute a requested job. In example implementations, some of which are described below, the job manager subsystem 112 may represent the Job Entry Subsystem (JES) of IBM, or different versions thereof, such as JES2 or JES3.

Common storage 114 represents memory (e.g., an example of the computer-readable storage medium 106) that may be used by the job manager subsystem 112, the MVS 110, or the OS 108. Other components of FIG. 1 may also access the common storage 114, as described in detail, below.

An application 116 represents virtually any application that may be executed using the mainframe computing device 102. For example, the application 116 may be configured to process various types of transactions, such as financial transactions. More generally, the application 116 may be configured to provide virtually any service or function that may be usable in the many contexts in which the mainframe computing device 102 may be deployed, such as in the healthcare, insurance, banking and finance, energy and oil and gas, manufacturing, or industrial settings referenced above. Provided functions may be as simple as, e.g., copying a data set, or as complex as may be supported by processing abilities of the at least one processor 104. The application 116 may be written using any known mainframe-compatible programming languages, such as, e.g., COBOL, PL/1, or Assembler.

In providing intended functions, the application 116 may be said to perform or execute multiple, discrete tasks, or jobs. One or more of these tasks may include inputting or outputting data. For example, the application 116 may be configured to output one or more different types of reports. More generally, the application 116 may be configured to output virtually any type of data set.

To enable such outputs of the application 116, and to facilitate execution of the application 116 in general, a JCL program 118 may be used. As referenced above, JCL provides a scripting language that provides tasks or jobs of the application 116 to MVS 110 or OS 108, e.g., using the job manager subsystem 112.

As also referenced above, both the application 116 and the JCL program 118 may represent large, complex, and/or stable programs that may have been in use by the mainframe computing device 102 for years or even decades. For example, the application 116 may be compiled and extremely stable, so that making changes to, and re-compiling and re-deploying, the application 116, may represent a large risk of time, resources, and consequences.

Somewhat similarly, the JCL program 118 may be subject to inherent limitations of JCL itself, so that making changes to the JCL program 118 may also be difficult, time-consuming, and risky. For example, as described and illustrated below, the JCL program 118 may include a plurality of jobs, each job having a maximum number of job steps (e.g., a maximum number of 255 job steps). Once the maximum number of job steps in a job is reached, it may be necessary to split the job into two or more separate jobs, in order to access additional job steps. Taking such an approach, however, may be complex and time-consuming. Similar to the application 116, even eventual success in such modifications may be unacceptable if accompanied by excessive intervening downtime and/or malfunctions.

Nonetheless, if splitting an existing job or exceeding a maximum number of job steps is not required, modification of the JCL program 118 may generally be preferable to modification of the application 116. That is, adding a job to, or modifying an existing job of, the JCL program 118 may be easier and less risky than making a change to (and having to re-compile) the application 116.

Further in FIG. 1, a multi-path subsystem 120, which includes a subsystem writer 122 as described below, may be activated by the JCL program 118 and configured to cause the application 116 to output a first output data set 126 and a second output data set 128. As referenced above, and described below, the application 116 is thus enabled to provide a multi-path output that includes both the first output data set 126 and the second output data set 128.

That is, the first output dataset 126 and the second output dataset 128 are both provided directly by the application 116 (using the OS 108), without requiring any intervening copying or reproduction of an intervening output data set. Thus, any recipient of the first output dataset 126 and/or the second output dataset 128 may be assured of receiving an authentic, unaltered output of the application 116. Moreover, the first output dataset 126 and the second output dataset 128 may be produced easily, conveniently, and reliably, without requiring alterations to application code of the application 116.

In example implementations, the data 124 may be any data provided or calculated by, or accessible to, the application 116. For example, external data may originate outside of the application 116 but may be processed by the application 116 to obtain the data 124. In other examples, the data 124 may be previously stored data of the application 116. In some examples, the data 124 may be specified simply by providing a relevant memory address from which to copy or process data.

The first output dataset 126 and the second output dataset 128 may be provided in many different ways, using many different formats and output media. For example, the first output dataset 126 and the second output dataset 128 may be provided as files, reports, or other discrete data collections. The first output dataset 126 and the second output dataset 128 may be provided to a specific output device that may share a network connection with the mainframe computing device 102, such as a network printer. The first output dataset 126 and the second output dataset 128 may be transmitted to a database or other storage/memory locations. The first output dataset 126 and the second output dataset 128 may be automatically encrypted, such as when being output to a secured hard drive.

In order to cause the application 116 to directly output the first output dataset 126 and the second output dataset 128 as just described, without requiring changes to code of the application 116, the JCL program 118 may be configured to cause the job manager subsystem 112 to activate the multi-path subsystem 120. The JCL program 118, when executed, may be further configured to cause the multi-path subsystem 120 to interact with the job manager subsystem 112, the common storage 114, and/or the application 116, to cause the application 116 to output the first output dataset 126 and the second output dataset 128. In some example implementations, although not explicitly illustrated in FIG. 1, the multi-path subsystem 120 may also be configured to output or forward the first output dataset 126 and possibly copies thereof.

For the sake of explanation, FIG. 1 includes a simplified JCL excerpt 130 of the JCL program 118. As shown, the JCL excerpt includes a job step 132 specified as "EXEC Application," indicating that the application 116 should be executed. As referenced above, and described in detail, below, execution of the application 116 may include execution of multiple tasks by the MVS 110, each task described using at least one task control block (TCB) of a TCB hierarchy of tasks. As also referenced above, the job step "EXEC Application" may be one of only 255 allowed job steps of a larger job of the JCL program 118.

The JCL excerpt 130 further illustrates multiple "data description" (DD) statements 134, 136, 138. As shown, the DD statement 134 specifies an input data set to be written (which is the data 124 in the example).

A second DD statement 136 then specifies the output data set(s), which are the first output data set 126 and the second output data set 128. In the example, the first output data set 126 may be a job log (referenced as JOBLOG), while the second output dataset 128 may be a general spool output intended for further processing on one or more peripheral devices (referenced as OUTDDN). Of course, these outputs are just examples, and as described herein, the output data sets 126, 128 may be written to any desired network location reachable by the mainframe computing device 102.

The DD statement 136 specifies the multi-path subsystem 120 using the "SUBSYS=" command, which recognizes a 4-digit name (shown as "MPSS") indicating the multi-path subsystem 120 and activating relevant subsystem interface (SSI) functions, designated using function codes associated with the subsystem writer 122. As described in detail, below, the relevant function codes enable the subsystem writer 122 to cause the application 116 to output the data 124 to the first output data set 126 using the subsystem writer 122. The relevant function codes also enable the subsystem writer 122 to cause the application 116 to output the second output data set 128 to any desired location accessible by the mainframe computing device 102.

For example, the DD statement 136 includes specification of the multi-path subsystem 120, as well as identification of the subsystem writer 122 using a parameter 'JOBLOG' to identify the first output data set 126. The DD statement 136 then includes a second, alternate output shown as 'ALT (OUTDDN)', which names the fourth DD statement 138 as providing the output location for the second output data set 128. As shown in the DD statement 138, and as referenced above, the indicated output location for OUTDDN may be SYSOUT=*. It will be appreciated that in the preceding, the alternate output shown as 'ALT(OUTDDN)' is merely an example of a suitable parameter, and any other suitable parameter may be used, for example, to facilitate access to one or more alternate inputs/outputs from a single source, as described herein.

Although the DD statement 136 only specifies the two output data sets 126, 128, many more output data sets may be included. For each output data set, an additional, corresponding DD statement may be included following the DD statements 136, 138, which indicate(s) the output location of the referenced output data set. In JCL, as referenced above, a z/OS limit of the OS 108 may restrict a maximum number of job steps to 255, so that a maximum number of output locations or data sets may be limited to 255, or 255 minus an existing number of job steps that may exist in the corresponding job of the JCL program 118.

Thus, the subsystem writer 122 references interface functions, also referred to as exits, that (when activated) enable the multi-path subsystem 120 to provide a proprietary connection to an output or input file. Put another way, the subsystem writer 122 may be used to replace a standard or conventional file interface, to thereby provide all of the input/output functions of such a conventional file interface (including outputting the first output data set 126) while also performing various proprietary functions. As described herein, such proprietary functions may include causing the application 116 to output the second output data set 128 concurrently with the first output data set 126.

Figure 2:
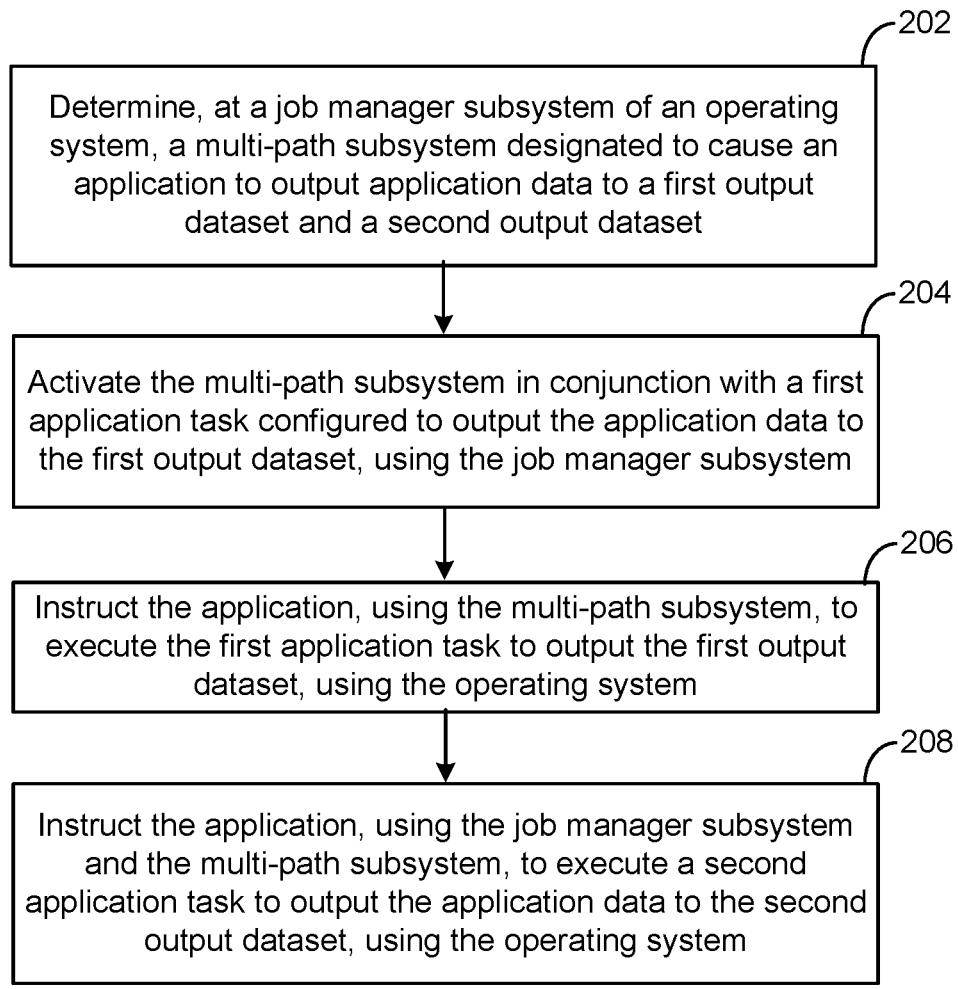
FIG. 2 is a flowchart illustrating example operations of the system of FIG. 1.

FIG. 2 is a flowchart illustrating example operations of the monitoring system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In the example of FIG. 2, a multi-path subsystem 120 designated to cause an application 116 to output application data 124 to a first output data set 126 and a second output data set 128 may be determined at a job manager subsystem 112 of an operating system 108 (202). For example, when executing the JCL program 118, the job manager subsystem 112 of the operating system 108 and the MVS 110 may determine the multi-path subsystem 120. As described, the multi-path subsystem 120 may be associated with function codes for enabling and configuring the subsystem writer 122 to cause the application 116 to output application data 124 to the first output data set 126 and the second output data set 128. The multi-path subsystem 120 may be activated during normal allocation processing associated with the JCL program 118, as described below.

The multi-path subsystem may be activated in conjunction with a first application task to output the application data 124 to the first output data set 126, using the job manager subsystem 112 of an OS (204). For example, the application 116 may be configured to perform some standard data processing, such as outputting a report to a particular destination. Such standard processing may include performing a file open operation(s), a file read operation(s), a file write operation(s), and/or a file close operation(s). Activating the multi-path subsystem 120 may include loading preconfigured service routines configured to execute the functions of the subsystem writer 122 (i.e., corresponding to the function codes of the subsystem writer 122). Activating the multi-path subsystem 120 may also include designating the multi-path subsystem 120 to be used with respect to write operations of the first application 116 task, including use of the subsystem writer 122.

The application 116 may be instructed, using the multi-path subsystem 120, to execute the first application 116 task to output the first output data set 126, using the operating system (206). For example, the subsystem writer 122 of the multi-path subsystem 120 may be configured to use its preconfigured, pre-loaded service routines to cause the application 116 to execute the first application 116 task and output the first output data set 126 as the subsystem data set, using otherwise standard output operations of the OS 108 (and/or the MVS 110).

The application 116 may be instructed, using the job manager subsystem 112 and the multi-path subsystem 120, to execute a second application task to output the application data 124 to the second output data set 128, using the operating system 108 (208). For example, as referenced above and described in detailed examples, below, the subsystem writer 122 may execute proprietary, preconfigured functions such as causing the second application 116 task to implement necessary open/write/close operations associated with outputting the second output data set 128, which are not otherwise included in normal, existing operations of the application 116.

Put another way, the application 116 includes at least one task that includes standard data set file operations such as open/close/read/write as well as network operations such a SNA and TCP/IP communications protocols associated with outputting the first output data set 126. The JCL program 118 specifies that the first output data set 126 being opened is a subsystem data set to be processed by the subsystem writer 122. In conjunction with this processing, the subsystem writer 122 instructs the application 116 to execute parallel, analogous open/write/close operations in the context of a second application 116 task, to thereby output the second output data set 128. In this way, as described, the goals of enabling and providing multi-path data outputs are achieved, without requiring modifications to the application 116. Instead, these goals are achieved through JCL modifications, without requiring splitting of existing jobs into new or additional jobs within the JCL program 118.

Figure 3:
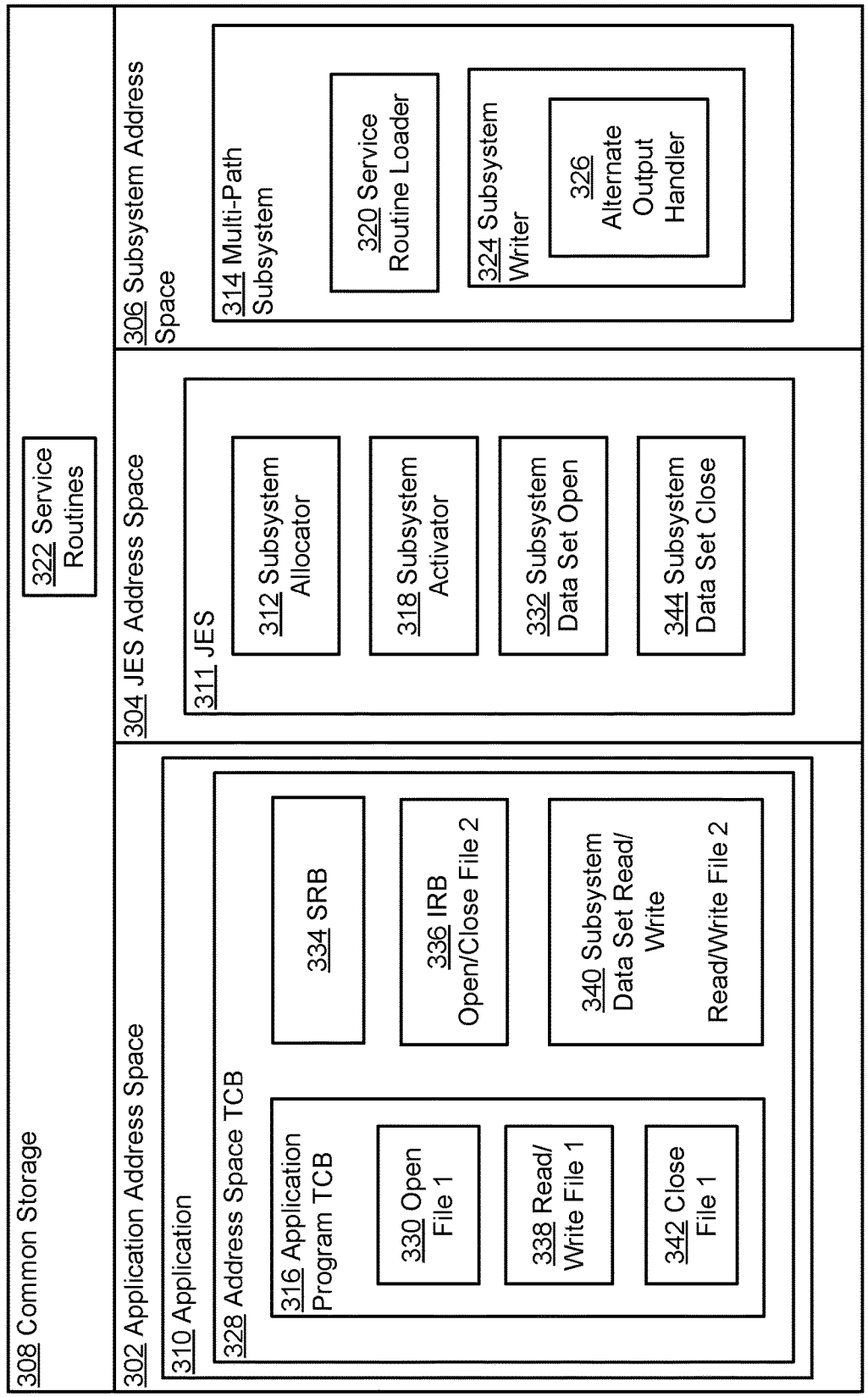
FIG. 3 is more detailed block diagram of an example implementation of the system of FIG. 1.

FIG. 3 is more detailed block diagram of an example implementation of the system of FIG. 1. FIG. 3 illustrates an application address space 302, a job entry system (JES) address space 304, a subsystem address space 306, and common storage 308.

As further illustrated, an application 310, as an example of the application 116 of FIG. 1, may be executed in the application address space 302. JES 311 may be executed in the JES address space 304. When JES 311 executes the JCL program 118 of FIG. 1 (not shown in FIG. 3, and with a more detailed example thereof provided below with respect to FIG. 8), a subsystem allocator 312 performs various functions related to allocating resources for a multi-path subsystem 314, corresponding to the MPSS 120 of FIG. 1. Example allocation operations are described below, with respect to FIG. 4.

Following these allocation operations, as the application 310 progresses through its normal operations, a first application 310 task may be executed in the context of an application program task control block (TCB) 316. As described above, such a task may include outputting the application data 124 of FIG. 1 as a first output data set 126.

In FIG. 3, to enable the multi-path outputs described herein, a subsystem activator 318 may activate the previously allocated multi-path subsystem 314 within the subsystem address space 306. Subsystem activation may include, e.g., using a service routine loader 320 to load designated service routines 322 from the common storage 308.

Once loaded, the service routines 322 include and provide functionalities for a subsystem writer 324, corresponding to the subsystem writer 122 of FIG. 1. The subsystem writer 324 enables the first application 310 task of the application program TCB 316 to output the first output data set 126 of FIG. 1.

The subsystem writer 324 is also illustrated as including an alternate output handler 326, which executes the types of proprietary functionalities referenced above as being providable by the subsystem writer 324. For example, the alternate output handler 326 may be configured to cause a second application 310 task of the application 310, associated with an address space TCB 328 of the application 310, to perform specific functions that enable the desired, specified operations for outputting the second output data set 128. As indicated in FIG. 3, the address space TCB 328 may be higher within a task or TCB hierarchy of the application 310, e.g., may be a highest TCB within the hierarchy.

In more detail, when the application program TCB 316 executes an open file 1 330 operation as part of its normal processing, the JES 311 recognizes the open file 1 330 operation as being associated with, and requiring, the multi-path subsystem 314, as a result of the previous allocation operations of the subsystem allocator 312 and the subsystem activation operations of the subsystem activator 318. Thus, the JES 311 and the multi-path subsystem 314 provide a subsystem data set open 332 operation, e.g., using the subsystem writer 324.

The subsystem data set open 332 operation provides data set open operations for the first output data set 126, referenced as file 1 in the example of FIG. 3. In addition, and in parallel, the subsystem data set open 332 operation executes operations of the proprietary alternate output handler 326 to initiate a service request block (SRB) 334.

As shown, the SRB 334 may be initiated within the application address space 302 from outside of the application address space 302. The SRB 334 may then be configured to request a service, which in the example of FIG. 3 includes initiating an interrupt request block (IRB) 336. The IRB interrupts the processing of the application program TCB 316 to perform an open of the alternate, second output data set 128 of FIG. 1, referred to as file 2 in the example of FIG. 3.

Subsequently, the application program TCB 316 may perform a read/write file 1 operation 338, while the address space TCB 328 may perform a subsystem data set read/write file 2 340 operation. That is, in many of the provided examples, the operations 338, 340 are described as write operations for outputting file 1 and file 2. However, it will be appreciated from the present description that the same or similar techniques may be used to perform alternate read operations, as well. In other words, the multi-path subsystem 314 may be used to perform parallel inputs of two or more files, as well as to provide parallel outputs of two or more files.

Once specified write (or read) operations have concluded, the application program TCB 316 may perform a close file 1 operation 342, while the address space TCB 328 may perform a close file 2 operation using the IRB 336. Specifically, the close file 2 342 operation may use a subsystem data set close 344 operation provided by the JES 311 using the subsystem writer 324. The close file 2 342 operation is illustrated as being performed by the IRB 336, similar to the manner in which the IRB open file 2 336 operation was performed.

In this regard, however, it will be appreciated that the SRB 334 and the IRB 336 are shown in the singular in FIG. 3 for ease of illustration and explanation but may each represent two or more SRB, IRB instances. For example, separate IRBs may be used for open/close operations. In other examples, when three or more total outputs are specified, separate SRB, IRB pairs may be used for each alternate output. For example, separate SRB(s), IRB(s) may be provided for a third file (file 3), fourth file (file 4), and so on.

Figure 4:
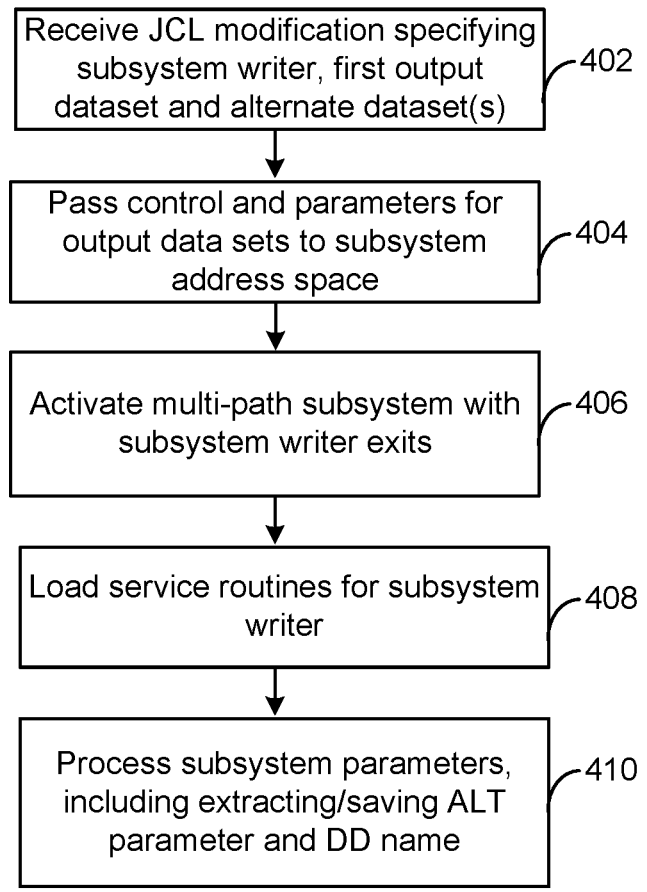
FIG. 4 is a flowchart illustrating example allocation and activation processes of the system of FIG. 3.

FIG. 4 is a flowchart illustrating example allocation and activation processes of the system of FIG. 3. In the example of FIG. 4, JCL modifications may be received that specify use of a subsystem writer to output a first output data set (e.g., the first output data set 126 of FIG. 1, or file 1 in FIG. 3), as well as any alternate data sets (e.g., the second output data set 128 of FIG. 1, or file 2 in FIG. 3) (402). As already mentioned, and as illustrated in more detail below with respect to FIG. 8, multiple alternate outputs may be specified.

JCL statements, such as shown in the JCL program 118 and JCL excerpt 130 of FIG. 1, as well as illustrated in FIG. 8, generally provide instructions to the OS 108 (and/or MVS 110) specifying each application to be executed and defining data sets that will be used by the application(s). For example, JCL program 118 statements may define the data set in terms of its name, physical data storage device, size, and other required parameters.

As described herein, the modified JCL program 118 statements may specify a subsystem and subsystem writer 324 interface functions for obtaining desired alternate outputs from the application 310 being executed. Consequently, when the JCL program 118 statements are processed, control and parameters for output data sets may be passed to the subsystem address space 306 of FIG. 3 (404).

In conjunction with the first task of the application program TCB 316, the multipath subsystem 314 may be activated with desired exits or interfaces for the subsystem writer 324 (406). Required service routines 322 may be loaded from common storage 308 by the service routine loader 320 (408).

The relevant subsystem parameters may thus be processed, i.e., extracted and saved for later use during upcoming open/read/write/close operations, including extracting or saving alternate parameter and DD name (410). For example, with reference to the JCL excerpt 130 of FIG. 1, the subsystem parameters may include, from the DD statement 136, the name of the MPSS's subsystem writer 122, as well as the first output parameter JOBLOG. The alternate output parameter OUTDDN is specified that identifies the alternate DD name OUTDDN of the DD statement 138.

In another example implementation illustrating the operations 402-410 of FIG. 1, an existing, conventional DD statement for writing data to an output data set may be written as: //SYSUT2 DD DISP=SHR, DSN=OUTPUT.DATA SET. As described herein, a user may modify such a JCL program 118 statement to specify the MPSS 120 for a DD statement, and to also specify an alternate DD name to which to write data. As just referenced, the DD statement 136 of FIG. 1 provides an example in which a subsystem data set is specified using the notation //SYSUT2 DD SUBSYS=(SSID), where the subsystem identifier (SSID) may be any four-digit identifier such as MPSS in the above examples, to designate the particular subsystem ID being used. By itself, this approach enables the application data 124 to be sent to the subsystem interface of the specified subsystem writer 122 without any application modification, to be output as the desired data set (e.g., JOBLOG in FIG. 1).

In addition, described techniques take an alternate parameter passed to the subsystem interface of the specified subsystem writer 122, where the alternate parameter is defined in the separate, specified DD statement. In general form, this approach may be written as

//SYSUT2 DD SUBSYS=(SSID,'ALT(ALTDDN)')
//ALTDDN DD SYSOUT=*

As shown, the alternate parameter may be generally written as ALTDDN to reference the corresponding DD statement named ALDTDDN. In the example of FIG. 1, the alternate parameter for the second output data set 128 is designated as OUTDDN. More generally, as referenced above and shown in the examples of FIG. 8, below, the alternate outputs may be designated in any desired fashion, so that alternate outputs may be sent to virtually any network-compatible location.

Thus, FIG. 4 illustrates that allocation processing may include processing subsystem parameters, including extracting and/or saving the specified alternate parameters and associated DD names. Subsystem control and activation control are provided so that, e.g., a corresponding application task (e.g., the task of the application program TCB 316) for writing the specified output data sets when executing, may be recognized by the JES 311 as being associated with (and requiring use of) the multi-path subsystem 314. As described in detail below, the allocation and activation processes of FIG. 4 thus enable use of the allocated, saved data sets for desired open/write/close operations of the task being executed, and for parallel open/write/close operations initiated by the subsystem writer 324 and the alternate output handler 326, e.g., in the context of the second application task of the address space TCB 328.

Figure 5:
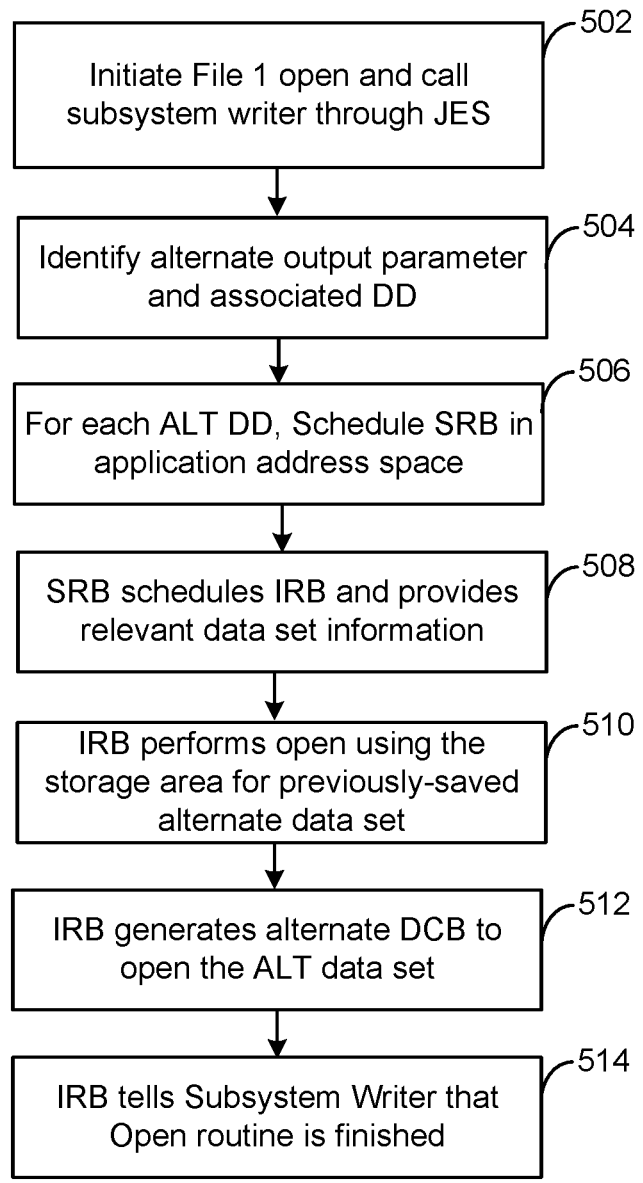
FIG. 5 is a flowchart illustrating an example open process of the system of FIG. 3.

FIG. 5 is a flowchart illustrating an example open process of the system of FIG. 3. That is, during normal data set processing by the application 310, a designated data set is opened to write file 1. In FIG. 5, the file 1 open is initiated, and the subsystem writer 324 is called through JES 311 (502). More specifically, because the data set that is being opened is designated as a subsystem data set, the subsystem function data set open operation 330 is performed using the subsystem data set open 332 operation as executed by JES 311 in conjunction with the subsystem writer 324.

In addition, the subsystem data set open operation 332, in conjunction with the alternate output handler 324, may be configured to identify any previously saved alternate output parameter(s) and associated DD(s) (504). For each alternate DD, the subsystem data set open operation 332 schedules an SRB, represented by the SRB 334 in FIG. 3, within the application address space 302 (506).

As noted above, the systems of FIGS. 1 and 3 are configured to cause the applications 116, 310 to output two or more output data sets in multi-path fashion, in order to ensure authenticity and convenience in the generation of multiple outputs. Consequently, the alternate output handler 326 is configured to cause the subsystem data set open operation 332 to schedule the SRB 334 to run within the application address space 302. As described, doing so enables subsequent write operations to also occur within the application address space 302.

Specifically, the SRB 334 may then schedule the IRB 336 (where this process is repeated for each different alternate parameter/output and associated DD statement) within the address space 302 and provides relevant data set information (508). The SRB 334 may also forward or otherwise provide the previously saved data set information for the alternate parameters, as determined during the allocate and activate processes of FIG. 4.

In this way, the IRB 336 may be configured to perform the open operation 336 and use the storage area that contains the data set for previously saved alternate data sets (510). In some cases, the IRB also may be configured to generate a corresponding alternate data control block (DCB) needed to open the alternate data set (512), and ultimately to write to file 2.

In general, a DCB provides the description of the data set of any application or program, including information about characteristics and processing requirements of the data set to be read or written. In conventional usage, a DCB is determined by its corresponding application, and all required DCB parameters are present. For example, a DCB may specify a record format, a record type or record length, or the block size.

In examples described herein, however, such DCB information may or may not be present with respect to an alternate data set. That is, a user may use an alternate parameter to designate a desired alternate data set, but the user may or may not provide associated DCB parameters.

If the user provides DCB parameters, then the IRB 336 may provide the corresponding data set accordingly. If the user does not provide DCB parameters, then the IRB 336 may auto-generate conservative or best-guess parameters that are most likely to enable the desired data to be written.

For example, during the open operation of the IRB 336, an open exit of the subsystem writer 324 may be called. When this open exit is called, a corresponding DCB automatically has DCB parameters filled in from a Job File Control Block provided by the OS 108 and/or the MVS 110.

The job file control block (JFCB) may provide some but not all of the required DCB parameters. For example, the JFCB may provide the record format (RECFM) DCB parameter or not. If the RECFM DCB parameter is not filled in, it may be assumed that the DCB has just been specified as the generic SYSOUT=*. For example, the RECFM may be designated as variable blocked (VB), with a logical record length (LRECL) of a maximum available value (e.g., 32756) and a block size BLKSIZE of max value (e.g., 32760). If a LRECL received from the JFCB is set to 0, the LRECL and BLKSIZE may be set to max values. If the BLKSIZE is set to 0, the BLKSIZE may be set to its maximum value.

The above DCB parameters are merely examples. Other assumptions may be made. In general, it is possible to assume that more storage area (or max available) may be required than may actually be required, in order to ensure that the desired data set may successfully be written without any truncation being required. Once the alternate DCB is opened, the address of the alternate DCB may be saved in the storage area that was communicated to the IRB 336 by the SRB 334.

Then the IRB 336 may communicate to the subsystem writer 324 subsystem data set open 332 operation that the open routine of the IRB 336 is completed (514). In this way, the interruption of application program TCB 316 by the IRB 336 running on the address space TCB 328 (e.g., as a top TCB in the application address space 302) may be ended, and processing may continue.

Figure 6:
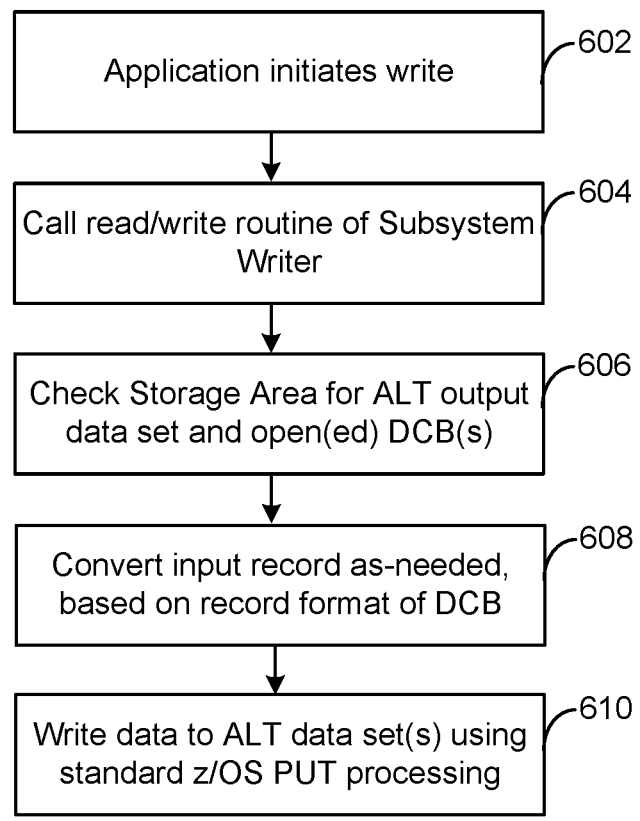
FIG. 6 is a flowchart illustrating an example write process of the system of FIG. 3.

FIG. 6 is a flowchart illustrating an example write process of the system of FIG. 3. For example, when the application 310 needs to write a record (e.g., file 1), it initiates a write operation (602). Since the output data set is the subsystem writer 324 as specified in the corresponding JCL statement as described herein, the subsystem data set read/write 340 operation of the subsystem writer 324 is called (604). The previously determined storage area for the alternate output data set(s) and opened DCBs is/are checked to see if any alternate output data set exists and is opened (606).

An input record may be converted as needed, based on the previously determined record format of the DCB(s) (608). For example, if the DCB RECFM is VB, the input record to be written may be converted to VB format with four bytes appended to the front of the record with the relevant length. If the RECFM is FB (fixed block) then the record may be left as it is. The converted record may then be written to the alternate data set using standard z/OS PUT processing (610).

Figure 7:
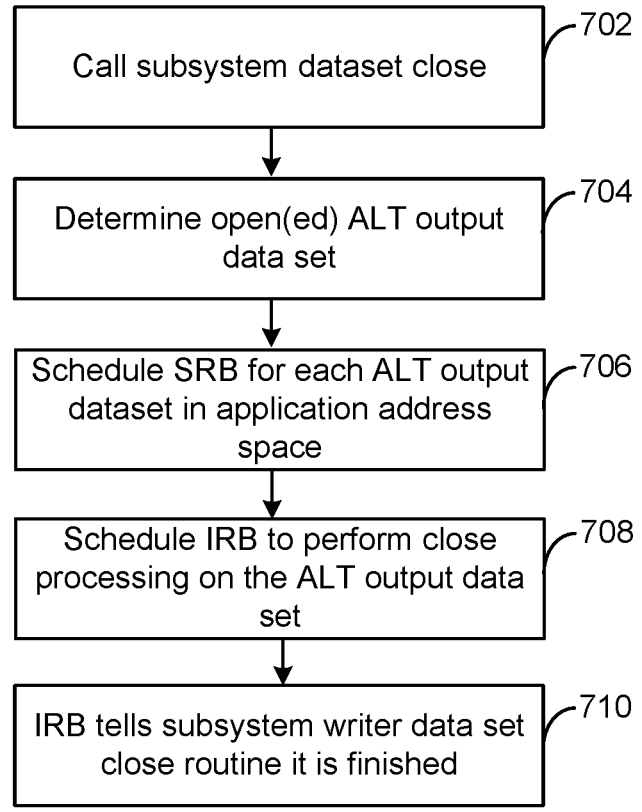
FIG. 7 is a flowchart illustrating an example close process of the system of FIG. 3.

FIG. 7 is a flowchart illustrating an example close process of the system of FIG. 3. In the example of FIG. 7, once the application 310 is finished writing and is configured to close the subsystem writer 324 data set, the subsystem data set close function 344 may be called (702), e.g., by the close file 1 342 operation.

Any existing, opened alternate output data set may be determined (704). For each alternate output data set in the application address space 302, another SRB may be scheduled (706). Each such SRB may then schedule an IRB to perform close processing on the alternate output data set (708) where the scheduled IRB will run on the top TCB in the application 310 program address space. Once closed, the IRB tells the subsystem writer 324 subsystem data set close routine 344 that it is finished (710), and processing continues.

FIG. 8 is an example screenshot of program code that may be used in the system of FIG. 3. In the example of FIG. 8, a line 802 indicates a job step for executing the application program CUSTPGM.

A line 804 defines an input file or data set, similar to line 134 of FIG. 1. A line 806 defines a multi-path output using techniques described herein. In the example of FIG. 8, the specified subsystem is designated as MPSS, with a first output parameter of JOBLOG, similar to the example of FIG. 1. Then, a first alternate parameter is provided as OUTDDN, again similar to FIG. 1. A second alternate parameter IRE is provided that may be configured to send the output data set to a printer of a corresponding user, while a final alternate output parameter TNY is specified, which may designate an encrypted hard drive of a specified user.

Then, a line 808 may specify the destination of the first alternate output OUTDDN, similar to the line 138 of FIG. 1. As noted, the line 808 does not provide any DCB parameters, and would therefore require the DCB generation techniques discussed above. In optional examples, the line 808 could be modified to use the same destination, but with DBC parameters specified, e.g., as SYSOUT=*, DCB= (RECFM=FB, LRECL=133, BLKSIZE=133).

Further in FIG. 8, a line 810 indicates the destination for the second alternate output destination of IRE. Finally in FIG. 8, a line 812 indicates the destination for the second alternate output destination of TNY.

As described above, described techniques provide an ability to send a file or other output data set to both the subsystem writer and an alternate DD statement in the same job step. In example implementations, the various operations, functions, and associated interfaces and exits of the subsystem writer as described herein may be implemented in part using pre-defined function codes available when generating custom subsystems in corresponding mainframe environments. For example, one or more of the defined subsystem function codes 6, 7, 16, 17, 38, or 39 may be used. Such function codes may be designed for specific, corresponding purposes, such as, e.g., to open or close a file, allocate or unallocate/deallocate a data set, or convert/interpret/parse JCL.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A non-transitory computer-readable storage medium on which instructions are tangibly embodied, wherein the instructions, when executed by at least one computing device, are configured to cause the at least one computing device to:
    determine, at a job manager subsystem of an operating system, a multi-path subsystem designated to cause an application to output application data to a first output data set and a second output data set;
    activate the multi-path subsystem in conjunction with a first application task configured to output the application data to the first output data set, using the job manager subsystem;
    instruct the application, using the multi-path subsystem, to execute the first application task to output the application data to the first output data set, using the operating system; and
    instruct the application, using the job manager subsystem and the multi-path subsystem, to execute a second application task to output the application data to the second output data set, using the operating system.

2. The computer program product of claim 1, wherein the instructions are further configured to cause the at least one computing device to:
    parse job control language (JCL) statements for the application to determine the multi-path subsystem, the first output data set, and the second output data set.

3. The computer program product of claim 2, wherein the instructions are further configured to cause the at least one computing device to:
    designate a storage area for the second output data set, based on the JCL statements, using the multi-path subsystem.

4. The computer program product of claim 1, wherein the instructions are further configured to cause the at least one computing device to:
    activate the multi-path subsystem including passing the first output data set and the second output data set to a subsystem address space of the multi-path subsystem; and
    load, from a common storage area to the subsystem address space, at least one service routine for performing a subsystem data set open, a subsystem data set read/write, and a subsystem data set close.

5. The computer program product of claim 1, wherein the instructions are further configured to cause the at least one computing device to:
    execute the first application task to output the first output data set using a subsystem writer open exit provided by the job management system on behalf of the multi-path subsystem.

6. The computer program product of claim 1, wherein the instructions are further configured to cause the at least one computing device to:
    execute the second application task to output the application data to the second output data set by scheduling a service request block (SRB) within an application address space of the application.

7. The computer program product of claim 6, wherein the first application task is executed using a first task control block and the second application task is executed using a second task control block that is higher within a task hierarchy than the first task control block.

8. The computer program product of claim 7, wherein the instructions are further configured to cause the at least one computing device to:
    instruct the SRB to schedule an interrupt request block (IRB) within the application address space, the IRB configured to perform an open operation for the second output data set.

9. The computer program product of claim 1, wherein the first output data set and the second output data set are identified within a single job step of a JCL program executed using the job manager subsystem to execute the application.

10. The computer program product of claim 1, wherein the first output data set and the second output data set are identified within a single data description (DD) statement of a JCL program executed using the job manager subsystem to execute the application.

11. A computer-implemented method, the method comprising:
    determining, at a job manager subsystem of an operating system, a multi-path subsystem designated to cause an application to output application data to a first output data set and a second output data set;
    activating the multi-path subsystem in conjunction with a first application task configured to output the application data to the first output data set, using the job manager subsystem;
    instructing the application, using the multi-path subsystem, to execute the first application task to output the application data to the first output data set, using the operating system; and
    instructing the application, using the job manager subsystem and the multi-path subsystem, to execute a second application task to output the application data to the second output data set, using the operating system.

12. The method of claim 11, further comprising:

parsing job control language (JCL) statements for the application to determine the multi-path subsystem, the first output data set, and the second output data set.

13. The method of claim 11, further comprising:

executing the second application task to output the application data to the second output data set by scheduling a service request block (SRB) within an application address space of the application.

14. The method of claim 13, wherein the first application task is executed using a first task control block and the second application task is executed using a second task control block that is higher within a task hierarchy than the first task control block.

15. The method of claim 14, further comprising:

instructing the SRB to schedule an interrupt request block (IRB) within the application address space, the IRB configured to perform an open operation for the second output data set.

16. The method of claim 11, wherein the first output data set and the second output data set are identified within a single job step of a JCL program executed using the job manager subsystem to execute the application.

17. The method of claim 11, wherein the first output data set and the second output data set are identified within a single data description statement of a JCL program executed using the job manager subsystem to execute the application.

18. A mainframe system comprising:
at least one memory including instructions; and
at least one processor that is operably coupled to the at least one memory and that is arranged and configured to execute the instructions that, when executed, cause the at least one processor to:
determine, at a job manager subsystem of an operating system, a multi-path subsystem designated to cause an application to output application data to a first output data set and a second output data set;
activate the multi-path subsystem in conjunction with a first application task configured to output the application data to the first output data set, using the job manager subsystem;
instruct the application, using the multi-path subsystem, to execute the first application task to output the application data to the first output data set, using the operating system; and
instruct the application, using the job manager subsystem and the multi-path subsystem, to execute a second application task to output the application data to the second output data set, using the operating system.

19. The system of claim 18, wherein the instructions are further configured to cause the at least one processor to:

parse job control language (JCL) statements for the application to determine the multi-path subsystem, the first output data set, and the second output data set.

20. The system of claim 18, wherein the first output data set and the second output data set are identified within a single data description statement of a JCL program executed using the job manager subsystem to execute the application.

* * * * *